(12) United States Patent
Odenheimer et al.

(10) Patent No.: US 8,645,483 B2
(45) Date of Patent: Feb. 4, 2014

(54) GROUPWARE-INTEGRATED BUSINESS DOCUMENT MANAGEMENT

(75) Inventors: Jens Odenheimer, Karlsruhe (DE); Peter Eberlein, Malsch (DE)

(73) Assignee: SAP AG, Walldorf (DE)

( * ) Notice: Subject to any disclaimer, the term of this patent is extended or adjusted under 35 U.S.C. 154(b) by 99 days.

(21) Appl. No.: 13/296,350

(22) Filed: Nov. 15, 2011

(65) Prior Publication Data

US 2013/0124647 A1    May 16, 2013

(51) Int. Cl.
*G06F 15/16* (2006.01)
(52) U.S. Cl.
USPC ............ 709/206; 709/204; 709/205; 709/207
(58) Field of Classification Search
USPC .................................. 709/206, 204, 205, 207
See application file for complete search history.

(56) References Cited

U.S. PATENT DOCUMENTS

| | | | |
|---|---|---|---|
| 7,409,333 B2 * | 8/2008 | Wilkinson et al. | 704/2 |
| 2007/0089053 A1 * | 4/2007 | Uhlig et al. | 715/513 |
| 2007/0186214 A1 * | 8/2007 | Morgan | 718/100 |

* cited by examiner

*Primary Examiner* — Wing F Chan
*Assistant Examiner* — Padma Mundur
(74) *Attorney, Agent, or Firm* — Buckley, Maschoff & Talwalkar LLC

(57) ABSTRACT

A system may include generation of a markup language representation of a business document based on a business object model, and generation of a first multi-part MIME electronic mail message comprising a first part and a second part, the first part associated with a text content-type and the second part associated with an attachment content-disposition, and the second part comprising the markup language representation of the business document. The first electronic mail message may be transmitted to a business application platform associated with the business document and implementing the business object model.

17 Claims, 10 Drawing Sheets

305 MIME-Version: 1.0
Content-Type: multipart/mixed; boundary="SAP_SECTION_SEPARATOR"
Content-ID: 21436547567252345234546765469O8@mobile0001.sap.com
310
           320
--SAP_SECTION_SEPARATOR
Content-Type: text/plain
                325          330
Hi John,
315
I've attached the draft Sales Order we talked about. Please review and make changes if necessary
Please send it back to me for further processing. Regards, Jim
                         335
--SAP_SECTION_SEPARATOR
                         345
Content-Type: application/soap+xml
                                          350
Content-Disposition: attachment; filename=SAP_BD001.sbd;
  modification-date="Wed, 12 April 2011 13:21:09 +0100";
                                                          355

<soapenv:Envelope xmlns:soapenv="http://schemas.xmlsoap.org/soap/envelope/"
xmlns:glob="http://sap.com/xi/SAPGlobal20/Global">
   <soapenv:Header/>
   <soapenv:Body>
     <glob:SalesOrderCreateRequest_sync>
        <BasicMessageHeader>
              <ID>JohnsSO_Account001</ID>
              <UUID>01a8fb20-5549-11e0-b8af-0800200c9a62</UUID>
        </BasicMessageHeader>
        <SalesOrder>
           <AccountParty>
              <PartyKey>
                 <PartyID>001</PartyID>
              </PartyKey>
           </AccountParty>

340
           <Product>
              <ProductID>ASK_0001</ProductID>
              <Quantity>5</Quantity>
           </Product>

<Product>
              <ProductID>ASK_0002</ProductID>
              <Quantity>20</Quantity>
           </Product>

<Product>
              <ProductID>ASK_0003</ProductID>
              <Quantity>10</Quantity>
           </Product>

</SalesOrder>

</glob:SalesOrderCreateRequest_sync>
   </soapenv:Body>
</soapenv:Envelope>

FIG. 3

405 MIME-Version: 1.0
    Content-Type: multipart/mixed; boundary="SAP_SECTION_SEPARATOR"
    Content-ID: 21436547567252345234454676546908@mobile0001.sap.com
410
                                        420
       --SAP_SECTION_SEPARATOR
      ⎧ Content-Type: text/plain
      ⎪                       425                    430
      ⎪ Hi John,
415 ⎨ I've edited the draft Sales Order based on your comments. I'll submit it for processing.
      ⎪ Regards, Jim
      ⎪                       435
      ⎩ --SAP_SECTION_SEPARATOR   445
      ⎧ Content-Type: application/soap+xml
      ⎪ Content-Disposition: attachment; filename=SAP_BD001.sbd;   450
      ⎪     modification-date="Thur, 13 April 2011 10:51:49 +0100";
      ⎪                                                                          455
      ⎪ <soapenv:Envelope xmlns:soapenv="http://schemas.xmlsoap.org/soap/envelope/"
      ⎪ xmlns:glob="http://sap.com/xi/SAPGlobal20/Global">
      ⎪    <soapenv:Header/>
      ⎪    <soapenv:Body>
      ⎪       <glob:SalesOrderCreateRequest_sync>
      ⎪          <BasicMessageHeader>
      ⎪              <ID>JohnsSO_Account001</ID>
      ⎪              <UUID>01a8fb20-5549-11e0-b8af-0800200c9a62</UUID>
      ⎪          </BasicMessageHeader>
      ⎪          <SalesOrder>
      ⎪             <AccountParty>
      ⎪                <PartyKey>
      ⎪                   <PartyID>001</PartyID>
      ⎪                </PartyKey>
      ⎪             </AccountParty>
440 ⎨
      ⎪             <Product>
      ⎪                <ProductID>ASK_0001</ProductID>
      ⎪                <Quantity>5</Quantity>
      ⎪             </Product>
      ⎪
      ⎪             <Product>
      ⎪                <ProductID>ASK_0002</ProductID>
      ⎪                <Quantity>15</Quantity>
      ⎪             </Product>
      ⎪
      ⎪             <Product>
      ⎪                <ProductID>ASK_0003</ProductID>
      ⎪                <Quantity>10</Quantity>
      ⎪             </Product>
      ⎪
      ⎪          </SalesOrder>
      ⎪
      ⎪       </glob:SalesOrderCreateRequest_sync>
      ⎪    </soapenv:Body>
      ⎩ </soapenv:Envelope>

GROUPWARE-INTEGRATED BUSINESS DOCUMENT MANAGEMENT

FIELD

Some embodiments relate to the integration of groupware with a business application platform.

BACKGROUND

Business software applications, such as Customer Relationship Management applications, Supply Chain Management applications, etc., provide business functionality to business users. Business applications typically execute within a business application platform having a dedicated user interface, and support user communication and collaboration. All business-related communication and collaboration is ideally performed through the business application platform, in order to capture all of the business information therein and to provide a centralized repository of consistent, persisted and auditable business information.

However, the ubiquity of electronic mail communication, and the difficulty in obtaining a communication link to a business application platform in some (e.g., mobile) scenarios, result in significant use of electronic mail for business communication and collaboration. Efficient integration between electronic mail and the applications provided by a business application platform is therefore desired.

This integration is particularly difficult in view of collaborative electronic mail communications between three or more parties. For example, in a conventional scenario, a Sales Representative uses electronic mail to propose a Sales Order to a customer. The customer, via return electronic mail, either accepts the Sales Order or requests modifications. The Sales Representative then sends a final Sales Order via electronic mail to a Sales Manager for approval. The Sales Manager forwards the approved Sales Order by electronic mail to data entry clerks, who finally create the Sales Order in a backend business application platform. Accordingly, none of the communications which occurred prior to creation of the Sales Order, which represent potentially-valuable business knowledge, are captured in the business application platform.

BRIEF DESCRIPTION OF THE DRAWINGS

FIG. 3 is a representation of a multi-part MIME message according to some embodiments.

FIG. 4 is a representation of a multi-part MIME message according to some embodiments.

DETAILED DESCRIPTION

Figure 1:
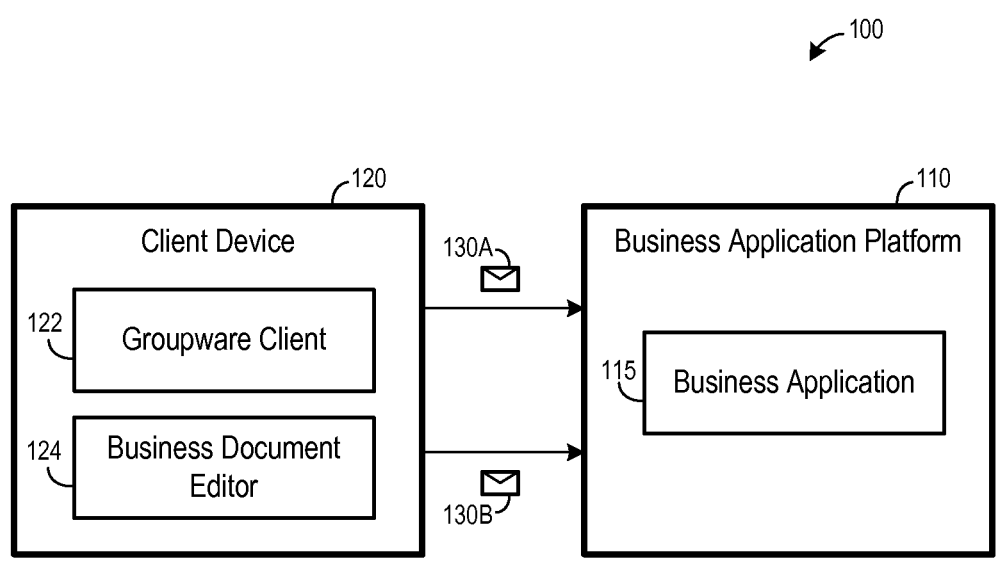
FIG. 1 is a block diagram of a system according to some embodiments.

FIG. 1 is a block diagram of system 100 according to some embodiments. Two or more of the elements of system 100 may be located remote from one another and may communicate with one another via a network and/or a dedicated connection. Moreover, each displayed element of system 100 may comprise any number of hardware and/or software elements suitable to provide the functions described herein, some of which are located remote from each other. Such hardware and software elements may include one or more processors, one or more storage devices, and processor-executable program code stored in the one or more storage devices and executable by the one or more processors to cause elements of system 100 to provide the functions described herein. Other topologies may be used in conjunction with other embodiments.

System 100 includes business application platform 110 and client device 120. Business application platform 110 may execute business application 115 to manipulate business data, and to provide business data and business functionality to client device 120. Business application platform 110 may comprise an enterprise services infrastructure and/or any implementation for providing services according to a service-oriented architecture paradigm.

Business application platform 110 may provide functionality based on "business objects", which are software models representing real-world entities involved in business transactions. For example, a business object may represent a sales order, a purchase order, or an invoice. A business object may also represent master data objects such as a product, a business partner, or a piece of equipment. Particular entities (e.g., Sales Order SO4711, ACME Corporation) are represented by instances of their representing business object, or business object instances. For purposes of the present description, such business object instances will be referred to as "business documents", regardless of whether the parent business object represents a traditionally-defined "document" (i.e., sales order, purchase order, invoice, etc.), a master data object, or another type of entity.

Client device 120 includes groupware client 122 and business document editor 124. Groupware client 122 may comprise processor-executable program code of any suitable application for generating and transmitting electronic mail messages. As will be described below, such electronic mail messages may include attachments.

Business document editor 124 may comprise program code executable by a processor to create and edit business documents as described herein. For example, a user may manipulate a user interface provided by business document editor 124 to create a sales order, and/or to edit the sales order based on client feedback.

Client device 120 may comprise any suitable device, such as a desktop computer, a laptop computer, a tablet computer, and a smartphone. Client device 120 may also include program code of a rich client application, an applet in a Web browser, or any other application to connect directly to business application platform 110 (e.g., via Web Services) and to display user interfaces and data received therefrom.

Figure 2:
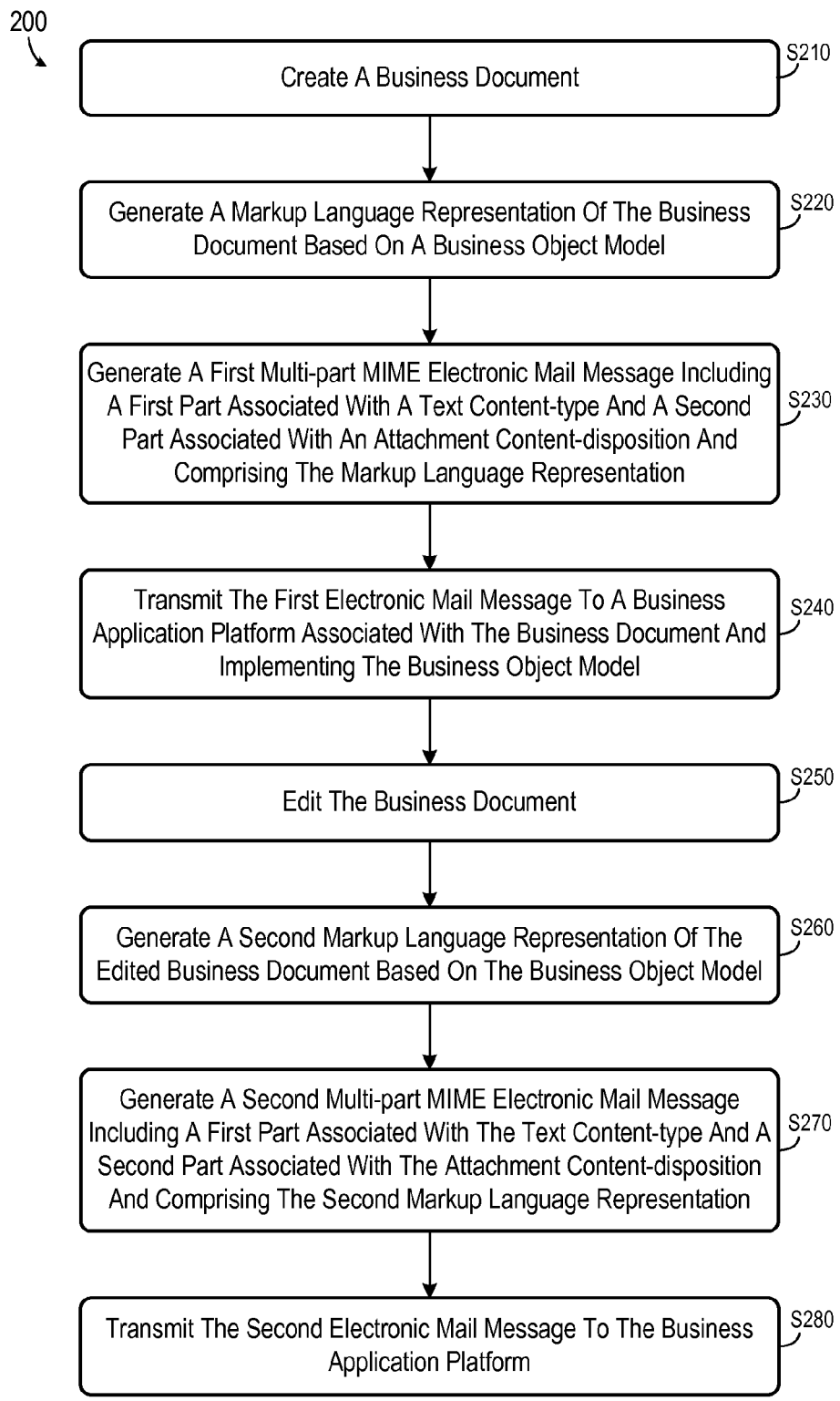
FIG. 2 is a flow diagram of a process according to some embodiments.

FIG. 2 is a flow diagram of process 200 according to some embodiments. System 100 may perform process 200 but embodiments are not limited thereto. Process 200 and all other processes mentioned herein may be embodied in processor-executable program code stored in a non-transitory computer-readable medium, such as a fixed disk, a floppy disk, a CD-ROM, a DVD-ROM, a Flash drive, Random Access Memory, Read Only Memory, and magnetic tape, and executed by a processor. In some embodiments, hard-wired circuitry may be used in place of, or in combination with, program code for implementation of processes according to some embodiments. Embodiments are therefore not limited to any specific combination of hardware and software.

Initially, a business document is created at S210. In one example according to some embodiments, a sales representative operates client device 120 at S210 to create a sales order using business document editor 124. Next, at S220, business document editor 124 generates a markup language representation of the business document based on a business object model implemented by business application platform 110. In other words, the markup language representation represents an instance of a business object model (e.g., a SalesOrder business object model) which is implemented by platform 110. Business document editor 124 may generate the markup language representation based on a schema of the business object model stored in client device or retrieved from platform 110.

The following is an example of a markup language representation generated at S220 according to some embodiments. Embodiments are not to be deemed limited thereto.

```
<soapenv:Envelope xmlns:soapenv="http://schemas.xmlsoap.org/soap/
envelope/"xmlns:glob="http://sap.com/xi/SAPGlobal20/Global">
  <soapenv:Header/>
  <soapenv:Body>
    <glob:SalesOrderCreateRequest_sync>
      <BasicMessageHeader>
        <ID>JohnsSO_Account001</ID>
        <UUID>01a8fb20-5549-11e0-b8af-0800200c9a62</UUID>
      </BasicMessageHeader>
      <SalesOrder>
        <AccountParty>
          <PartyKey>
            <PartyID>001</PartyID>
          </PartyKey>
        </AccountParty>
        <Product>
          <ProductID>ASK_0001</ProductID>
          <Quantity>5</Quantity>
        </Product>
        <Product>
          <ProductID>ASK_0002</ProductID>
          <Quantity>20</Quantity>
        </Product>
        <Product>
          <ProductID>ASK_0003</ProductID>
          <Quantity>10</Quantity>
        </Product>
      </SalesOrder>
    </glob:SalesOrderCreateRequest_sync>
  </soapenv:Body>
</soapenv:Envelope>
```

Next, at S230, a multi-part electronic mail message is generated conforming to the Multipurpose Internet Mail Extensions (MIME) standards (i.e., Request For Comments (RFC) 2045—Multipurpose Internet Mail Extensions (MIME) Part One: Format of Internet Message Bodies, RFC 2046—Multipurpose Internet Mail Extensions (MIME) Part Two: Media Types, RFC 2049—Multipurpose Internet Mail Extensions (MIME) Part Five: Conformance Criteria and Examples).

Generally, MIME defines mechanisms for sending information other than 7-bit ASCII via electronic mail. This information may include text which uses character encodings other than ASCII, and 8-bit binary content such as files containing images, sounds, movies, and computer programs.

The basic format of Internet electronic mail, as defined in RFC 5322, includes a body, headers, and rules associated with commonly-used headers such as To:, Subject:, From:, and Date:. MIME defines a collection of headers for specifying additional attributes of a message including Content-ID:, Content-Type:, and Content-Disposition:, among others. MIME is also extensible to allow registration of new content types and other MIME attribute values.

A first part of the multi-part electronic mail message generated at S230 is associated with a "text" content-type (e.g., text/plain) and a second part of the message is associated with an "attachment" content-disposition, and includes the markup language representation. In this regard, a MIME "multi-part" message contains a boundary in the "Content-Type:" header. This boundary is placed between the parts, and at the beginning and end of the body of the message.

FIG. 3 illustrates an example of multi-part electronic mail message 300 generated at S230 according to some embodiments. "Content-Type:" header 305 defines the boundary "SAP_SECTION_SEPARATOR", and "Content-ID:" header 310 uniquely identifies message 300 and its sender (i.e., mobile0001.sap.com).

First part 315 occurs after boundary 320, and includes "Content-Type:" header 325 which associates first part 315 with a text Content-Type. In this regard, first part 315 also includes text 330 which, in the present example, relates to the business document created at S210.

Boundary 335 separates first part 315 from second part 340. "Content-Type:" header 345 indicates that second part 340 is associated with a Simple Object Access Protocol and eXtensible Markup Language application and "Content-Disposition" header 350 associates second part 340 with an attachment content-disposition. According to the MIME standard, an attachment content-disposition indicates that the associated content is not displayed automatically but requires some action (e.g., a double-click) on the user's part to open the content. "Content-Disposition" header 350 also provides fields for specifying the name of the business document, the creation date (not used in message 300) and modification date.

Second part 340 also includes markup language representation 355 generated at S220. Markup language representation 355 is machine-readable by any system with knowledge of the schema on which it is based. Moreover, since representation 355 is associated with a Simple Object Access Protocol and eXtensible Markup Language application, such a system may properly identify and read representation 355.

Returning to process 200, the generated electronic mail message is transmitted at S240 to a business application platform associated with the business document and implementing the business object model. FIG. 1 illustrates the transmission of message 130A to business application platform 110 at S240 according to some embodiments. According to some embodiments, the "To:" header of message 130A includes the electronic mail address of an intended reader (e.g., "John" referenced in test 330 of message 300), while the electronic mail address business application platform 110 is automatically included in the "Cc:" header field of message 130A. Message 130A is therefore delivered to the intended reader (not shown in FIG. 1) and to business application platform 110. In some embodiments, the "To:" header field of message 130A may include an electronic mail address of the business application platform 110.

Business application platform 110 may receive the electronic mail message and extract the markup language representation. Because the markup language representation conforms to a business object model of business application platform 110, platform 110 may use a standard interface to import the associated business document (e.g., instantiate and store an object instance of the business document). Moreover, the Content-ID header uniquely identifies the sender and a timestamp may be extracted from the Content-Disposition header. Consequently, business application platform 110 may track the creation and modification history of the business document.

According to process 200, the business document is edited at S250. The present example of FIG. 1 assumes that business document editor 124 is operated to edit the business document. For example, if the business document is a sales order, S250 may include specifying changing the items and/or quantities listed in the sales order.

S260 through S280 proceed as described above with respect to S220 through S240, but in association with the edited business document. Specifically, a second markup language representation of the edited business document is generated at S260 based on the business object model, and a second multi-part MIME electronic mail message is generated at S270. A first part of the second multi-part MIME electronic mail message is associated with the text Content-type and a second part of the message is associated with the attachment Content-disposition. Moreover, the second part includes the second markup language representation.

FIG. 4 shows an example of second multi-part MIME electronic mail message 400 generated at S270. This example assumes that the business document represented in message 300 has been edited to change the quantity of the product associated with ProductID "ASK_0002" from 20 to 15.

"Content-Type:" header 405, "Content-ID:" header 410, and "Content-Type:" header 425 are identical to headers 305, 310 and 325 of message 300. Text 430 indicates that the sales order is an edited version of a prior sales order. "Content-Disposition" header 450 specifies a new modification date, and markup language representation 455 (i.e., generated at S260) includes the same ID (i.e., JohnsSO_Account001) and UUID (i.e., 018fb20-5549-11e0-b8af-0800200c9a62) as markup language representation 355. The identical ID and UUID allow a reader of markup language representation 455 to determine that representation 455 is associated with a same business document (e.g., Sales Order) as representation 355. Representation 455 also reflects the change in quantity of the product associated with ProductID "ASK_0002" from 20 to 15.

The second electronic mail message is transmitted to the business application platform at 5280. FIG. 1 illustrates the transmission of message 130B to business application platform 110 at 5280 according to some embodiments. Again, the "To:" header of message 130B may include the electronic mail address of the intended reader (e.g., "John"), while the electronic mail address business application platform 110 is automatically included in the "Cc:" header field of message 130B.

Upon receipt of message 130B, business application platform 110 may use a standard interface to identify an associated stored business document instance and to edit the business object instance based on the second markup language representation. Again, modification history may be tracked via Content-Disposition header 450.

Figure 5:
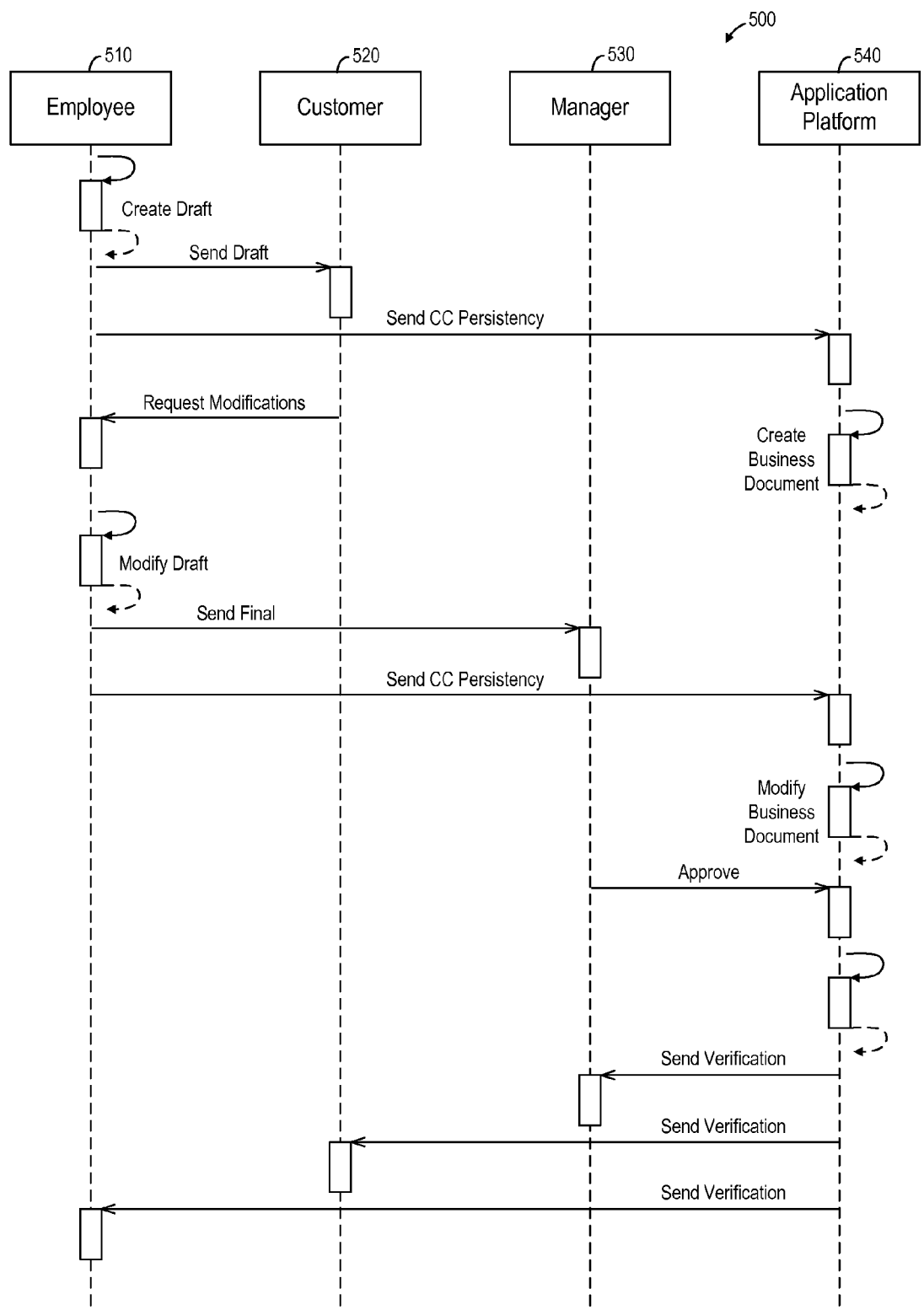
FIG. 5 is a sequence diagram of a process according to some embodiments.

FIG. 5 is a sequence diagram according to some embodiments. Sequence diagram 500 provides an operational example including employee 510, customer 520, manager 530 and business application platform 540. Architecture 600 illustrates a computing environment for executing sequence 500 according to some embodiments. Generally, employee device 610 operates to execute the steps attributed to employee 510, customer device 620 operates to execute the steps attributed to customer 520, manager device 630 operates to execute the steps attributed to manager 630, and business application platform 640 operates to execute the steps attributed to business application platform 540.

Figure 7:
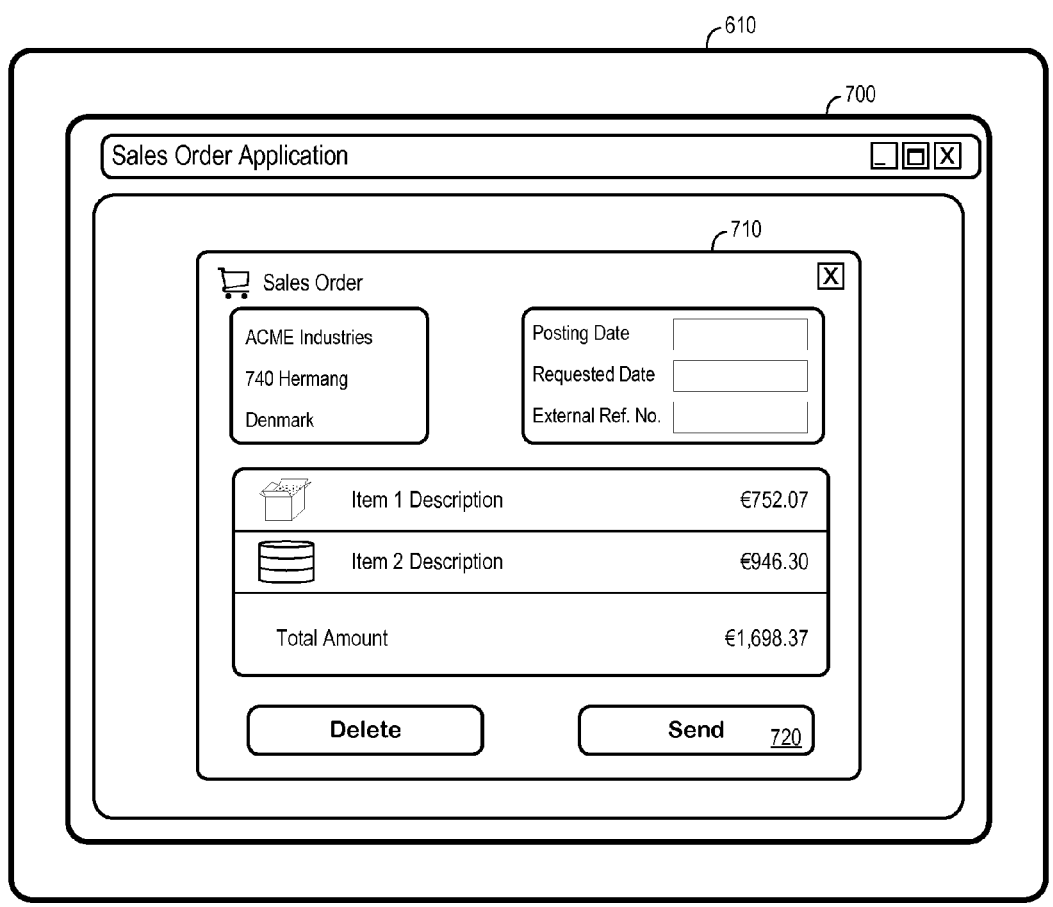
FIG. 7 is a view of a user interface for viewing a business document according to some embodiments.

Initially, employee 510 creates a draft of a business document. Similar to that described above, employee 510 may operate employee device 610 to execute business document editor 614 and create the draft business document. FIG. 7 is an outward view of employee device 610 according to some embodiments. Employee device 610 may comprise any suitable device.

Device 610 of FIG. 7 displays interface 700 of business document editor 614. Employee 510 may interact with interface 700 to create a sales order graphically represented in window 710. Employee 510 selects send icon 720 to send the draft to another party.

Figure 8:
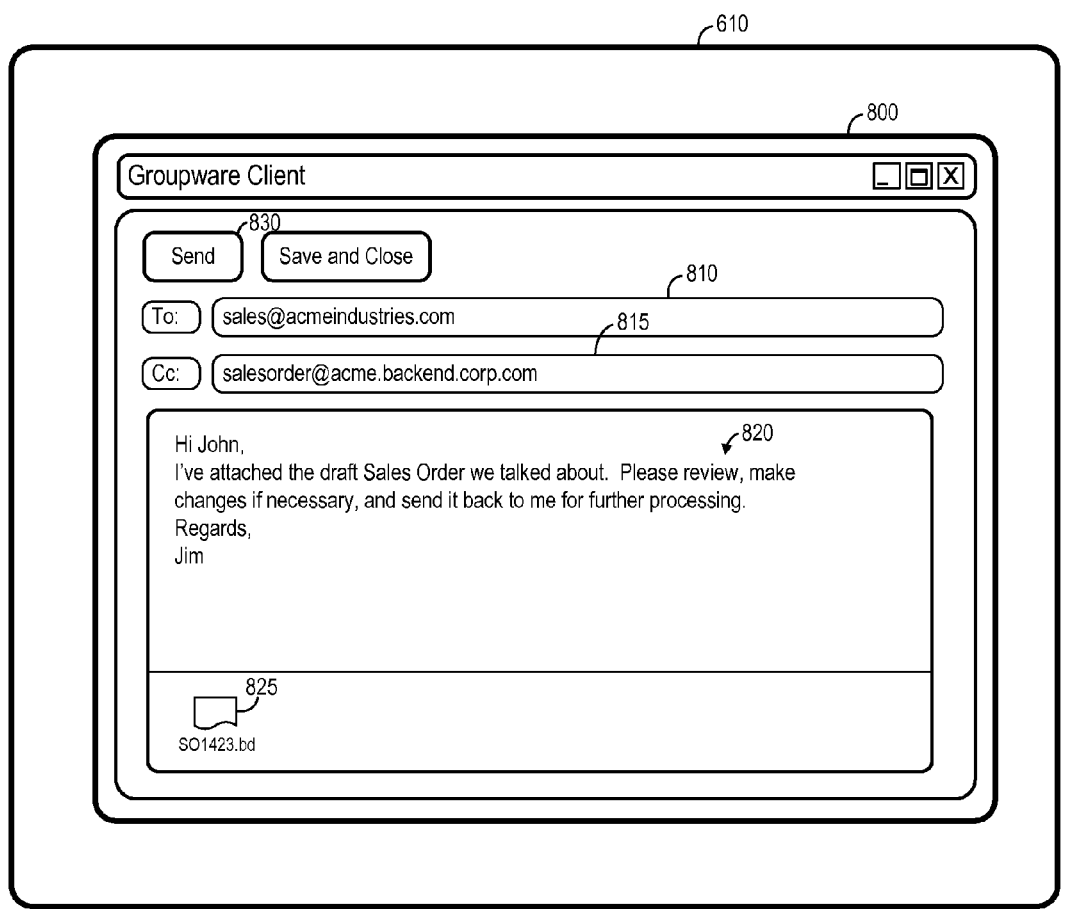
FIG. 8 is a view of a groupware client user interface according to some embodiments.

To send the draft sales order, a corresponding markup language representation is initially generated as described above. Moreover, employee device 610 invokes groupware client 612 to display interface 800 of FIG. 8. Interface 800 represents a new electronic mail message and may be pre-populated with information as described below.

To: field 810 includes an electronic mail address of customer 520 (e.g., entered by employee 510 or pre-populated based on the address information of window 710) and Cc: field 815 includes an electronic mail address associated with application platform 540. Field 815 may be automatically pre-populated upon display of interface 800. According to some embodiments, the electronic mail address associated with application platform 540 may be included in a Bcc: field so that it is not shown to the recipient listed in To: field 810.

File 825 is an attachment including the markup language representation of the sales order. The electronic mail message may also be pre-populated with file 825. Specifically, upon selection of Send icon 720, a markup language representation of the sales order is generated and a message similar to those shown in FIGS. 3 and 4 is generated to include the markup language representation. Some fields of the message might not yet be populated while others (e.g., the Cc: header field) might be populated. Groupware client 612 then reads the message in order to display interface 800. Employee 510 may populate additional fields (e.g., To: field 810, text 820) and then, upon selection of Send icon 830, the message is edited to include these fields and is then transmitted using electronic mail protocols.

Due to the addresses of the To: and Cc: header fields, the message (e.g., message 616) is transmitted to customer device 620 and to application platform 640 (i.e., "Send CC Persistency"). Business application platform 640 may receive message 616 via groupware client 642 and, as mentioned above, invoke application interfaces 644 of business application 646 to create an instance of the business document and store the instance in business data 648.

Customer device 620 may execute groupware client 622 to receive and open message 616. Customer device 620 may include an application for viewing attachment 825. In some embodiments, message 616 includes a second attachment including the draft in a commonly-readable format (e.g., .pdf, .doc, .jpg). Customer 520 opens the second attachment, reviews the draft and, as shown in FIG. 5, requests modifications via email, telephone, etc.

In some embodiments, customer device 620 includes business document editor 624 and business document editor 624 is associated with a filetype of attachment 825. Therefore, customer 520 simply double-clicks on the attachment to view and/or edit the draft in an interface of editor 624. Customer 520 may then create and transmit message 626 back to employee device 510 as described above. A Cc: header field of message 626 may similarly include the electronic mail address of platform 640 so that message 626 is also transmitted to platform 640.

Figure 6:
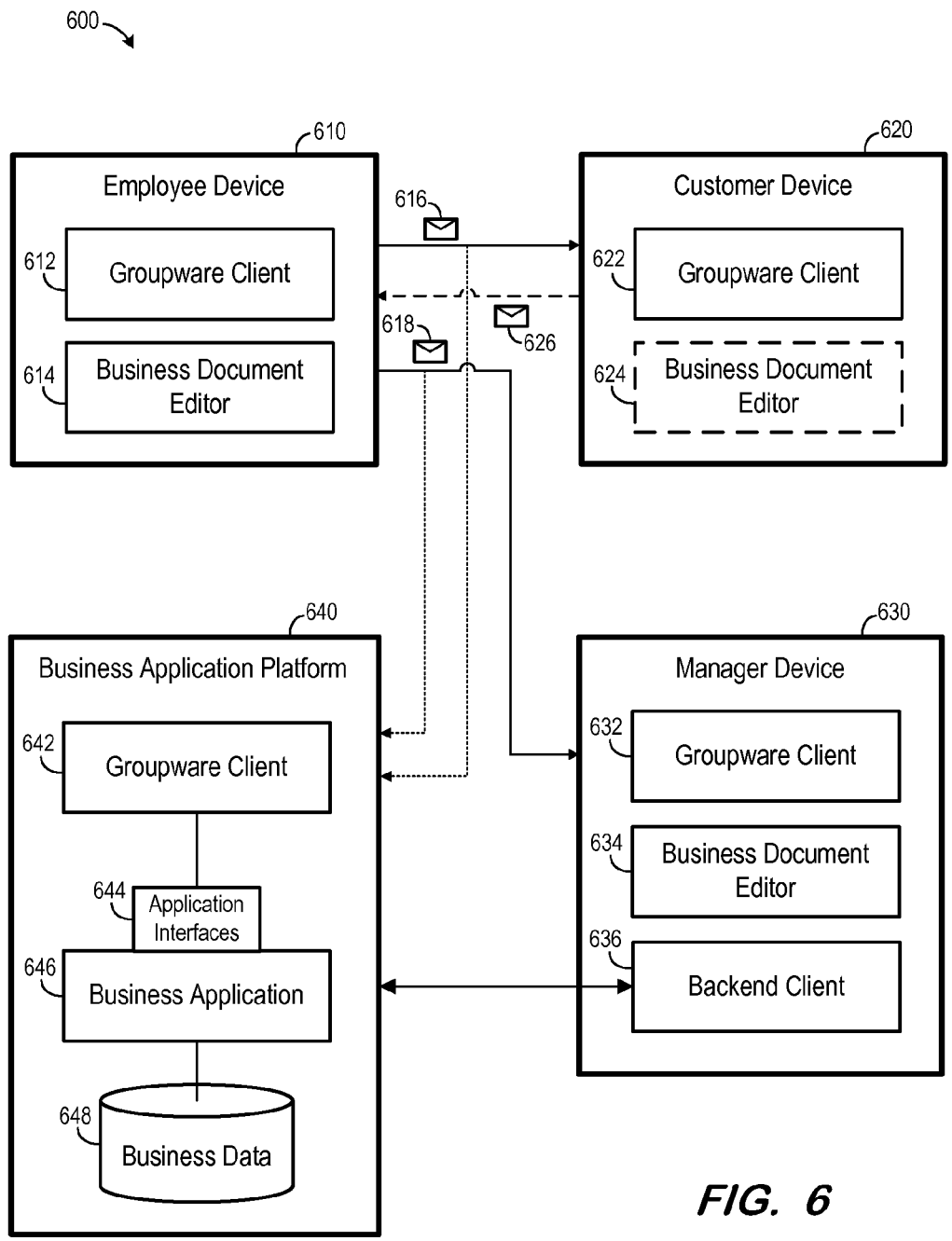
FIG. 6 is a block diagram of a system according to some embodiments.

Employee 510 modifies the draft as requested, for example, as described with respect to S250 of process 200. A second electronic mail message (e.g., message 618) is then generated as described above. However, the To: header field of the second message includes an electronic mail address associated with manager device 630. Accordingly, as depicted in FIGS. 5 and 6, the second message is sent to manager device 630 and to business application platform 640.

Business application platform 640 operates as described above to extract the modified document from the markup language representation and to modify the previously-created instance based thereon. Meanwhile, manager device 630 operates groupware client 632 and business document editor 634 to open message 618 and its included attachment.

Next, to approve the sales order, manager device 630 executes backend client to interface directly with platform 640. Backend client 636 may comprise a proprietary software application for communication with platform 640, including but not limited to Web browser-executable program code.

Figure 9:
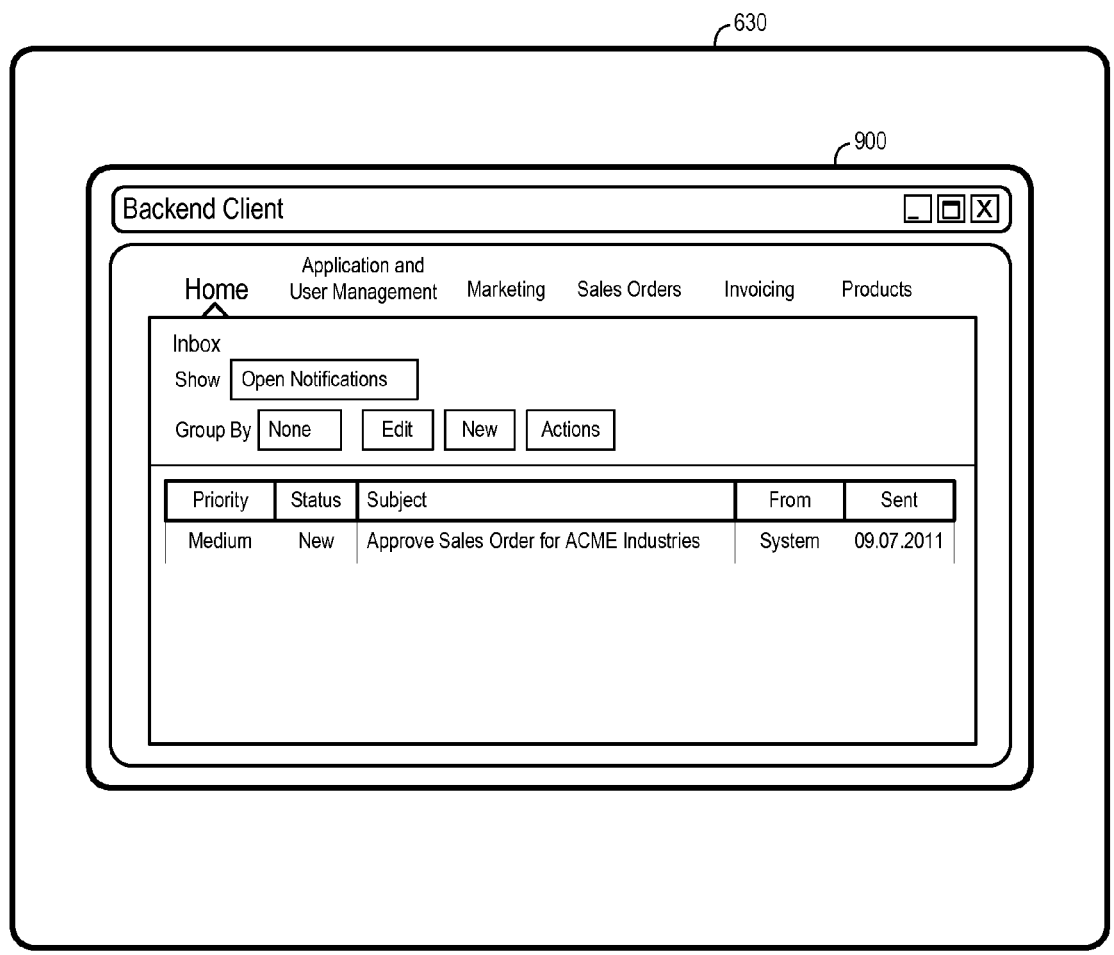
FIG. 9 is a view of a backend client user interface according to some embodiments.

FIG. 9 illustrates interface 900 of backend client 636 as displayed on manager device 630. Interface 900 lists notifications related to open tasks. As shown, platform 640 has instantiated a task in response to receiving the sales order and the task has been assigned to manager 530. Manager 530 may dispose of this task in any manner conforming to the business rules and workflow provided by platform 640. For example, upon approval of the sales order by manager 530, application platform 540 may send verifications to employee 510, customer 520 and manager 530.

Figure 10:
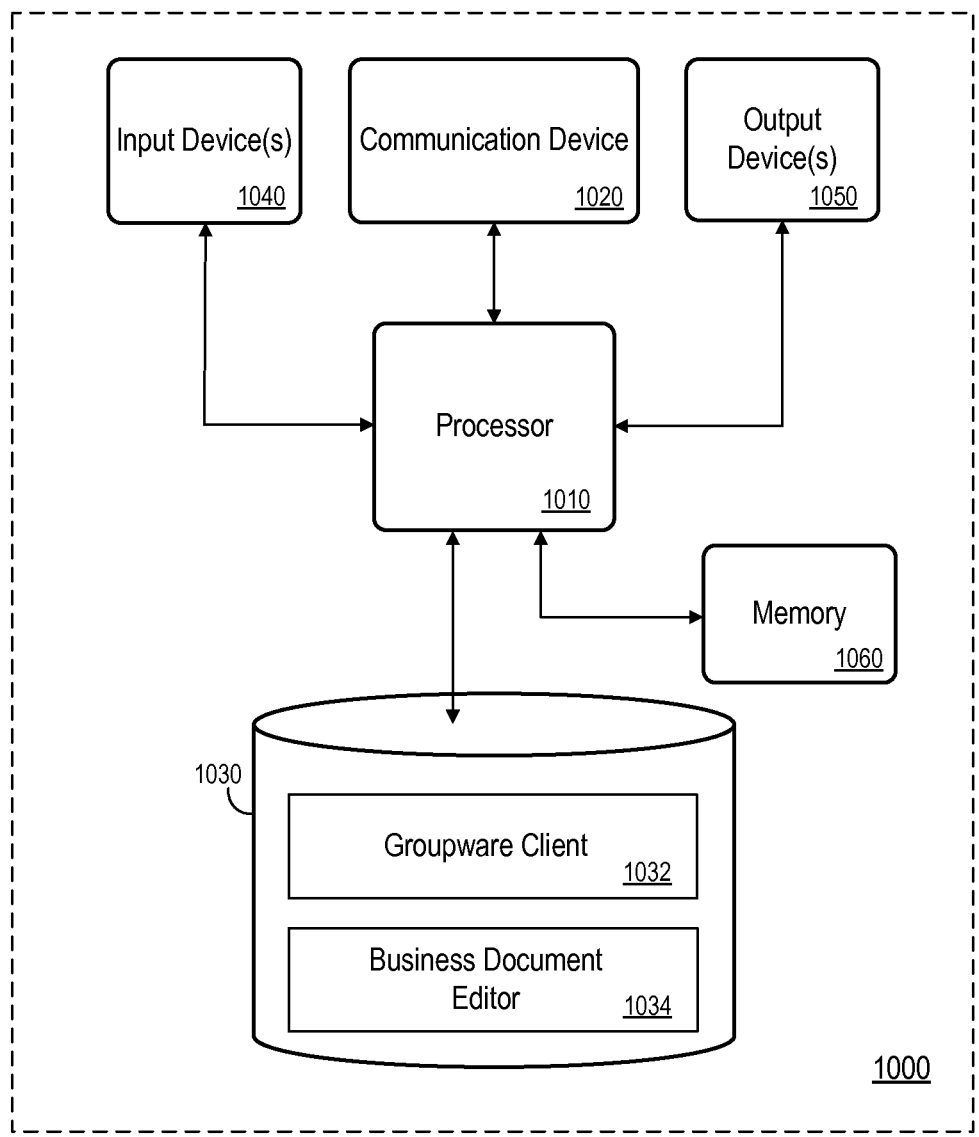
FIG. 10 is a block diagram of a computing device according to some embodiments.

FIG. 10 is a block diagram of apparatus 1000 according to some embodiments. Apparatus 1000 may comprise a general-purpose computing apparatus and may execute program code to perform any of the functions described herein. Apparatus 1000 may comprise an implementation of client device 120 and/or 610. Apparatus 1000 may include other unshown elements according to some embodiments.

Apparatus 1000 includes processor 1010 operatively coupled to communication device 1020, data storage device 1030, one or more input devices 1040, one or more output devices 1050 and memory 1060. Communication device 1020 may facilitate communication with external devices, such as a reporting client, or a data storage device. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to enter information into apparatus 1000. Output device(s) 1050 may comprise, for example, a display (e.g., a display screen) a speaker, and/or a printer.

Data storage device 1030 may comprise any appropriate persistent storage device, including combinations of magnetic storage devices (e.g., magnetic tape, hard disk drives and flash memory), optical storage devices, Read Only Memory (ROM) devices, etc., while memory 1060 may comprise Random Access Memory (RAM).

As shown, data storage device 1030 may store processor-executable program code of groupware client 1032 and business document editor 1034. Data storage device 1030 may also store data and other program code (a word processing program, a spreadsheet application, a Web browser, etc,) for providing additional functionality and/or which are necessary for operation thereof, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 or system 600 may include a processor to execute program code such that the computing device operates as described herein.

All systems and processes discussed herein may be embodied in program code stored on one or more computer-readable media. Such media may include, for example, a floppy disk, a fixed disk, a CD-ROM, a DVD-ROM, a Flash drive, magnetic tape, and solid state RAM or ROM storage devices. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The embodiments described herein are solely for the purpose of illustration. Those in the art will recognize other embodiments may be practiced with modifications and alterations limited only by the claims.

What is claimed is:

1. A method implemented by a computing system in response to execution of program code by a processor of the computing system, the method comprising:

creating, by a device operated by a first party, a business document, the business document comprising an instance of a software model representing a real world entity involved in a business transaction;

generating a markup language representation of the business document based on a business object model implemented by a business application platform;

generating a first multi-part Multipurpose Internet Mail Extension (MIME) electronic mail message comprising a first part and a second part, the first part associated with a text content-type and the second part associated with an attachment content-disposition, and the second part comprising the markup language representation of the business document;

transmitting the first electronic mail message to: (i) a device associated with a second party and (ii) the business application platform associated with the business document and implementing the business object model, wherein the business application platform is to extract the markup language representation of the business document, instantiate a business object instance of the business document based on the markup language representation of the business document, and store the business object instance instantiated based on the markup language representation of the business document;

receiving, by a device, a request for a modification to the business document;

editing, by a device, the business document;

generating a second markup language representation of the edited business document based on the business object model;

generating a second multi-part MIME electronic mail message comprising a third part, a fourth part, a second Content-ID identifying a sender of the second multi-part MIME electronic mail message, the filename of the business document and a second timestamp, the third part associated with the text content-type and the fourth part associated with the attachment content-disposition, and the fourth part comprising the second markup language representation;

transmitting the second electronic mail message to: (i) a device associated with a third party and (ii) the business application platform, wherein the business application platform is to edit a business object instance of the business document based on the second markup language representation; and receiving, from the business application platform, verification that the third party has approved the business document.

2. A method according to claim 1, wherein transmitting the first electronic mail message comprises:

transmitting the first electronic mail message to a recipient associated with a To: header field of the first electronic mail message, wherein the business application platform is associated with a Cc: header field of the first electronic mail message.

3. A method according to claim 1, wherein the first multi-part MIME electronic mail message comprises a Content-ID identifying a sender of the first multi-part MIME electronic mail message, a filename of the business document and a first timestamp.

4. A method according to claim 3, wherein transmitting the first electronic mail message comprises:

transmitting the first electronic mail message to a first recipient associated with a To: header field of the first electronic mail message, wherein the business application platform is associated with a Cc: header field of the first electronic mail message, and wherein transmitting the second electronic mail message comprises:

transmitting the second electronic mail message to a second recipient associated with a To: header field of the second electronic mail message, wherein the business application platform is associated with a Cc: header field of the second electronic mail message.

5. A non-transitory medium storing processor-executable program code, the program code executable by a device to:

create a business document, the business document comprising an instance of a software model representing a real world entity involved in a business transaction;

generate a markup language representation of the business document based on a business object model implemented by a business application platform;

generate a first multi-part Multipurpose Internet Mail Extension (MIME) electronic mail message comprising a first part and a second part, the first part associated with a text content-type and the second part associated with an attachment content-disposition, and the second part comprising the markup language representation of the business document;

transmit the first electronic mail message to: (i) a device associated with a second party and (ii) the business application platform associated with the business document and implementing the business object model, wherein the business application platform is to extract the markup language representation of the business document, instantiate a business object instance of the business document based on the markup language representation of the business document, and store the business object instance instantiated based on the markup language representation of the business document;

receive a request for a modification to the business document;

edit the business document;

generate a second markup language representation of the edited business document based on the business object model;

generate a second multi-part MIME electronic mail message comprising a third part, a fourth part, a second Content-ID identifying a sender of the second multi-part MIME electronic mail message, the filename of the business document and a second timestamp, the third part associated with the text content-type and the fourth part associated with the attachment content-disposition, and the fourth part comprising the second markup language representation;

transmit the second electronic mail message to: (i) a device associated with a third party and (ii) the business application platform, wherein the business application platform is to edit a business object instance of the business document based on the second markup language representation; and receive, from the business application platform, verification that the third party has approved the business document.

6. A non-transitory medium according to claim 5, wherein the program code executable by a device to transmit the first electronic mail message comprises program code executable by a device to:

transmit the first electronic mail message to a recipient associated with a To: header field of the first electronic mail message, wherein the business application platform is associated with a Cc: header field of the first electronic mail message.

7. A non-transitory medium according to claim 5, wherein the first multi-part MIME electronic mail message comprises a Content-ID identifying a sender of the first multi-part MIME electronic mail message, a filename of the business document and a first timestamp.

8. A non-transitory medium according to claim 5, wherein the program code executable by a device to transmit the first electronic mail message comprises program code executable by a device to:

transmit the first electronic mail message to a first recipient associated with a To: header field of the first electronic mail message, wherein the business application platform is associated with a Cc: header field of the first electronic mail message, and wherein the program code executable by a device to transmit the first electronic mail message comprises program code executable by a device to:

transmit the second electronic mail message to a second recipient associated with a To: header field of the second electronic mail message, wherein the business application platform is associated with a Cc: header field of the second electronic mail message.

9. A system comprising:
a computing device operated by a first party and comprising:
   a memory system storing processor-executable program code; and
   a processor to execute the processor-executable program code in order to cause the computing device to:
   create a business document, the business document comprising an instance of a software model representing a real world entity involved in a business transaction;
   generate a markup language representation of the business document based on a business object model implemented by a business application platform;
   generate a first multi-part Multipurpose Internet Mail Extension (MIME) electronic mail message comprising a first part and a second part, the first part associated with a text content-type and the second part associated with an attachment content-disposition, and the second part comprising the markup language representation of the business document;
   transmit the first electronic mail message to: (i) a device associated with a second party and (ii) the business application platform associated with the business document and implementing the business object model, wherein the business application platform is to extract the markup language representation of the business document, instantiate a business object instance of the business document based on the markup language representation of the business document, and store the business object instance instantiated based on the markup language representation of the business document;
   receive a request for a modification to the business document;
   edit the business document;
   generate a second markup language representation of the edited business document based on the business object model;
   generate a second multi-part MIME electronic mail message comprising a third part, a fourth part, a second Content-ID identifying a sender of the second multi-part MIME electronic mail message, the filename of the business document and a second timestamp, the third part associated with the text content-type and the fourth part associated with the attachment content-disposition, and the fourth part comprising the second markup language representation;
   transmit the second electronic mail message to: (i) a device associated with a third party and (ii) the business application platform, wherein the business application platform is to edit a business object instance of the business document based on the second markup language representation; and
   receive, from the business application platform, verification that the third party has approved the business document.

10. A system according to claim 9, wherein transmission of the first electronic mail message comprises:
   transmission of the first electronic mail message to a recipient associated with a To: header field of the first electronic mail message, wherein the business application platform is associated with a Cc: header field of the first electronic mail message.

11. A system according to claim 9, wherein the first multi-part MIME electronic mail message comprises a Content-ID identifying a sender of the first multi-part MIME electronic mail message, a filename of the business document and a first timestamp.

12. A system according to claim 9, wherein transmission of the first electronic mail message comprises:
   transmission of the first electronic mail message to a first recipient associated with a To: header field of the first electronic mail message, wherein the business application platform is associated with a Cc: header field of the first electronic mail message, and
   wherein transmission of the first electronic mail message comprises:
   transmission of the second electronic mail message to a second recipient associated with a To: header field of the second electronic mail message, wherein the business application platform is associated with a Cc: header field of the second electronic mail message.

13. A method according to claim 1, wherein the first party is an employee of an entity, the second party is a customer of the entity and the third party is a manager of the employee of the entity.

14. A method according to claim 1, wherein the receiving, by a device, a request for a modification to the business document comprises:
   receiving, by the device operated by the first party, the request for the modification to the business document; and
   wherein the editing, by a device, the business document comprises:
   editing, by the device operated by the first party, the business document.

15. A method according to claim 14, wherein the first party is an employee of an entity, the second party is a customer of the entity and the third party is a manager of the employee of the entity.

16. A non-transitory medium according to claim 5, wherein the program code executable by a device comprises program code executable by an employee of an entity; and
   wherein the second party is a customer of the entity and the third party is a manager of the employee of the entity.

17. A system according to claim 9, wherein the computing device comprises a computing device operated by an employee of an entity; and
   Wherein the second party is a customer of the entity and the third party is a manager of the employee of the entity.

* * * * *